April 1, 1958

W. MUENCH ET AL 2,829,155

PROCESS AND APPARATUS FOR THE PURIFICATION
OF DIMETHYLTEREPHTHALATE

Filed June 22, 1953

2 Sheets-Sheet 1

INVENTORS
WERNER MUENCH
LUIGI NOTARBARTOLO
ENRICO CROSIO

BY

ATTORNEYS

United States Patent Office

2,829,155
Patented Apr. 1, 1958

2,829,155

PROCESS AND APPARATUS FOR THE PURIFICATION OF DIMETHYLTEREPHTHALATE

Werner Muench, Cesano Maderno, Milan, and Luigi Notarbartolo and Enrico Crosio, Milan, Italy, assignors to Perfogit Società per Azioni, Milan, Italy Application June 22, 1953, Serial No. 363,154

Claims priority, application Italy July 28, 1952

4 Claims. (Cl. 260—475)

It is known that the dimethyl ester of terephthalic acid serves as an intermediate in the manufacture of polyesters, in particular polyesters intended as starting materials for the production of synthetic fibres. Any dimethyl terephthalate to be used for such a purpose must be considerably pure. On the contrary, the esters generally resulting from the manufacturing processes currently used in the industry, are raw, impure products, containing for instance non-esterified terephthalic acid, monoester, etc. Therefore it becomes necessary to purify the terephthalates thus prepared. It is the object of this invention to provide a process and an apparatus for the purification of dimethyl terephthalate. The process according to the invention is characterized in that the raw product is first converted from solid state to liquid and subsequently from liquid to vapour and that the vapour, carried along by an inert gas, is sublimated, that is returned directly to solid state. The temperature at which the dimethyl ester is brought may be comprised between 180 and 260° C., when not operating under a vacuum. The sublimation may be carried out at a relatively low temperature under a reduced pressure when it is desired to obtain a still purer product. For a truly complete understanding of the invention, it is however necessary that certain physico-chemical considerations be set forth, and this in turn can be conveniently done after describing, by way of example, an apparatus according to an embodiment of the invention, which apparatus is suitable for carrying into practice the aforementioned process according to the invention.

Figures 1, 2:
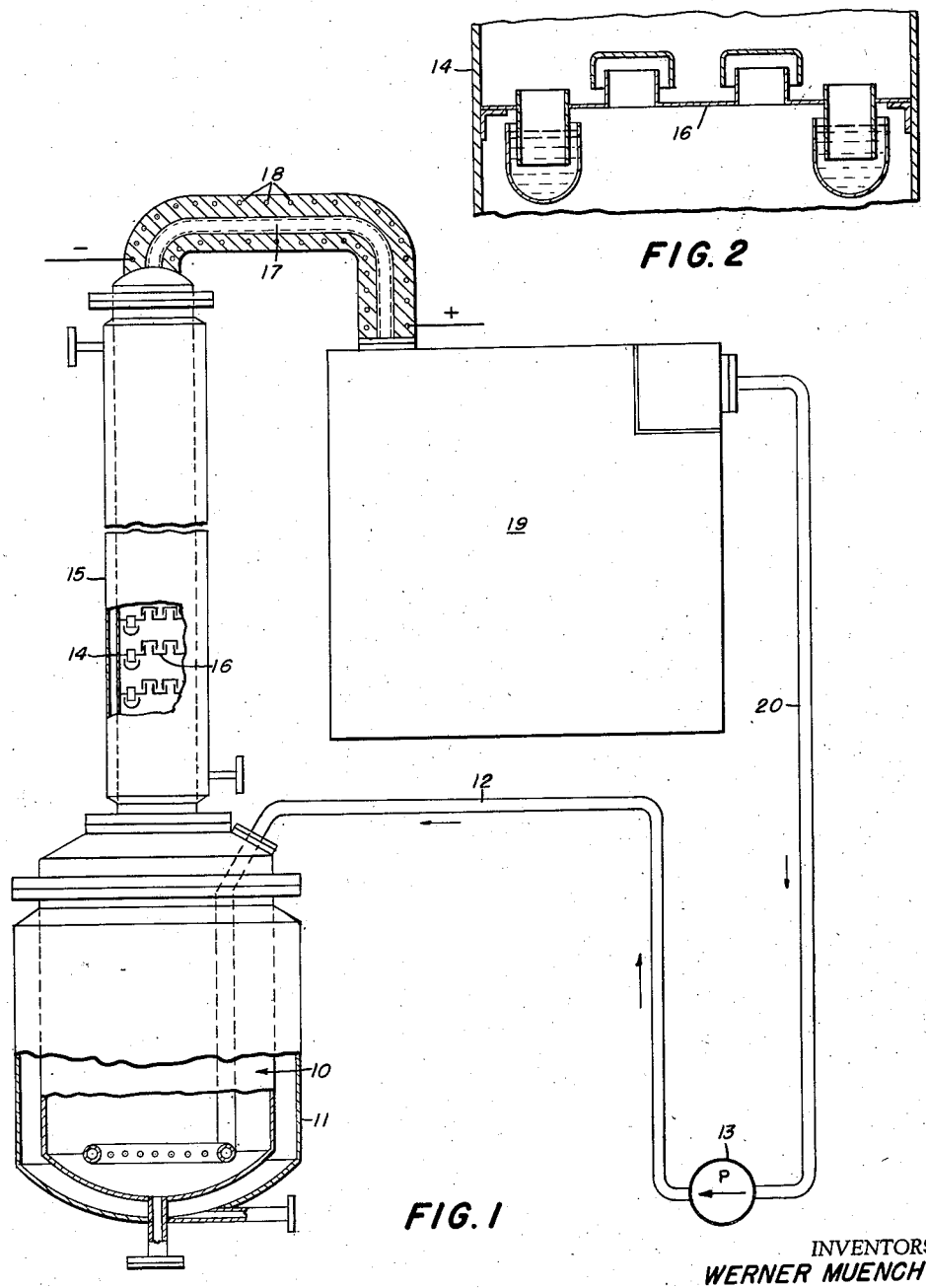
Figure 3:
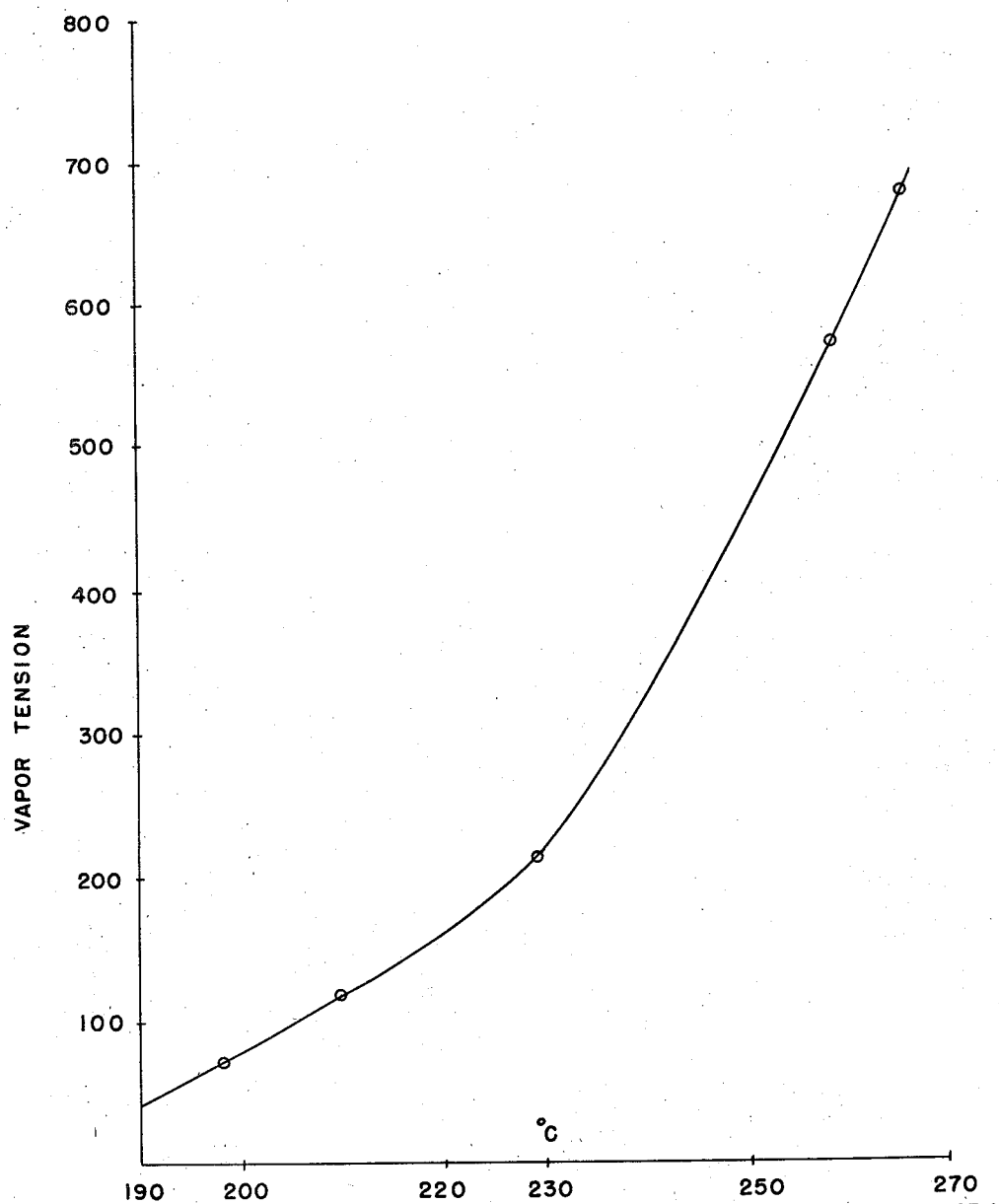

Such an apparatus will now be described with reference to the appended drawings, wherein Fig. 1 is a schematic elevational view of the apparatus, with certain portions broken off; Fig. 2 illustrates in vertical cross-section a detail of the apparatus; and Fig. 3 is a diagram wherein the vapor tensions of dimethyl terephthalate are plotted against the temperatures.

Referring now to Fig. 1, numeral 10 generally designates a still, provided with suitable heating means, for instance with a jacket 11 for the circulation of the heating fluid. The raw ester is brought into the molten state within still 10. A stream of an inert gas, f. i. nitrogen, is conveyed into the molten mass or at the surface thereof through a convenient pipe line 12; said gas is preferably circulated in a closed cycle, as shown in the drawing, by a pump 13 located at the tail end of the apparatus. The circulation of an inert gas considerably facilitates the desired flow of the vaporized ester. The inert gas and the terephthalic ester vapors mixed therewith, rise along rectifying column 14 which, in a practical case herein quoted by way of example, may have an inner diameter of 9.5 cms. and a height of 32 cms., and which is also provided with a jacket 15 and contains a certain number of plates or trays 16 of any suitable known type, f. i. bubble plates with circular caps of the type illustrated in Fig. 2. Further, column 14 is heated in such a way as to maintain the temperatures at the plates or trays at suitable values to be fixed according to the principles that will be specified further on.

From column 14 the mixture of inert gas and terephthalic ester vapor passes to a connecting pipe 17 which is heated, f. i. by means of a resistance 18, at a sufficiently high temperature to prevent the condensation of the vapors, f. i. at a temperature above 275° C. Said pipe—which in a practical case herein quoted by way of example, may have a diameter of 0.8 cm.—leads into sublimation chamber 19 which is maintained at a sufficiently low temperature to cause the dimethyl ester (the melting point whereof is 140° C.) to return directly to solid state. In practice said chamber is maintained at approximately room temperature, f. i. at 15–20° C., and is connected to pump 13 through pipe 20. Chamber 19 may be cooled, possibly by means of a water spray, or it may not be cooled.

The dimethyl terephthalate that has sublimated collects in said chamber in an extremely pure condition in the form of bulky white needles which, when crystallized from toluene, leave a residue of foreign substances not above 0.1%. The foreign substances which have not sublimated may be discharged, in the molten state, from the bottom of still 10; when saponified with caustic soda, they yield for the greater part sodium terephthalate, from which a sufficiently pure terephthalic acid may be recovered by known means.

In order clearly to understand the course of the sublimation, it is now convenient to refer to Fig. 3, wherein the abscissae are temperatures in degrees Celsius and the ordinates are vapor tensions in millimeters of mercury.

It is observed that the curve has a first portion approximately corresponding to temperatures up to 220–225° C., and a second portion, corresponding to the higher temperature, wherein the curve has a greater slope. It is clear that, since the curve has been drawn by interpolation, that is by process which necessarily entails a certain degree of discretion, it is impossible to state that there could not be more than one point of transition; however, at any rate, the transition between the first and the second slope is completed within a limited zone. The temperature of still 10, or the like, is maintained between 180 and 260° C. (when operating at atmospheric pressure); the temperature within column 13 may generally be different and may vary from point to point. Considering now the bubble plates or trays 16 or like devices located at the top of the column, in general the temperature thereon is lower than that in the still but it is anyway high enough to cause the terephthalate to vaporize at a sufficient speed. This temperature difference between still and plates causes a continuous reflux of the terephthalate, inasmuch as the vapors coming from the still in part condense on said plates while in part proceed to the sublimation chamber 19. It has been found that it is extremely desirable, if the sublimation is to develop satisfactorily, that such reflux be as intensive— that is, that the reflux ratio be as high—as possible. On the other hand, it is not convenient to increase the temperature in the still too much, as in such a case a less pure sublimated terephthalate would be obtained, and said temperature is preferably maintained between 240 and 260° C.; likewise it is not convenient to decrease the temperature of the plates too much, as this lowers the production. Essentially, it has been found that it is extremely desirable to operate in such conditions as to obtain a maximum reflux ratio with a minimum temperature difference between still and plates. But the reflux ratio depends on the difference between the vapor tension in the still and the vapor tension on the plates.

An examination of the diagram of Fig. 3 shows that for a same temperature difference between still and plates, the vapor tension difference is greater in the zone beyond the point at which the slope of the curve changes, that is the reflux ratio is higher if the temperature on the last bubble tray exceeds 220–225° C.; therefore it is preferred to operate in these conditions.

As an application of the foregoing principles, the following purely illustrative examples may be given of a sublimation carried out in an apparatus such as that illustrated. It is assumed that the temperature in the still is kept at 250° C. while the temperature on the last bubble tray of the column is of 237° C. In these conditions the yield of the operation is about 67–68%, whereby it is meant that the amount of terephthalate actually collected in the sublimation chamber is 67–68% of the theoretical amount, reckoned taking into account the vapor tension corresponding to the temperature on the plates. If the temperature difference between still and tray is increased, f. i. by bringing the first temperature up to 253° and the second down to 228–230°, the yield rises to 89%. By skillfully selecting the temperature according to the principle set forth, yield may be made to exceed 90% even while the sublimated product remains sufficiently pure.

It is understood that the invention is not limited to the details specified and particularly is not limited to the specific apparatus described by way of example, since other apparatus may be designed wherein the same phenomena will occur and the operation will be carried out in the manner set forth.

What we claim is:
1. A process for the purification of dimethyl terephthalate, comprising the steps of melting the terephthalate, heating the liquid terephthalate to vaporize the same, refluxing a portion of the terephthalate vapor by moderately cooling the same to condense a portion of it to liquid, uniting the terephthalate thus liquified to the liquid terephthalate being heated, entraining the uncondensed portion of the terephthalate vapor, by means of a stream of an inert gas, and subsequently cooling said inert gas and said uncondensed portion of the terephthalate vapor entrained thereby to a temperature below the melting point of the terephthalate to cause said vapor to separate from the inert gas as solid terephthalate.

2. A process according to claim 1, comprising the step of converting the liquid terephthalate to vapor by heating the same to temperatures between 180 and 260° C. at atmospheric pressure.

3. A process according to claim 1, comprising maintaining the terephthalate vapor from the time wherein they are formed by vaporization of the liquid terephthalate to the time wherein they are cooled below the melting point of the terephthalate, at temperatures not substantially below 220° C.

4. A process for the purification of dimethyl-terephthalate comprising the steps of melting the terephthalate, heating the liquid terephthalate to temperatures substantially comprised between 240° and 260° C. and at atmospheric pressure to vaporize the same, refluxing a portion of the terephthalate vapor by cooling the same to temperatures substantially comprised between 220° and 240° C. and at atmospheric pressure to condense a portion of it to liquid, uniting the terephthalate thus liquified to the liquid terephthalate being heated, entraining the uncondensed portion of the terephthalate vapor by means of a stream of an inert gas, and subsequently cooling said inert gas and said uncondensed portion of the terephthalate vapor entrained thereby to a temperature below the melting point of the terephthalate to cause said vapor to separate from said inert gas as solid terephthalate.

References Cited in the file of this patent
UNITED STATES PATENTS

| | | |
|---|---|---|
| 1,864,893 | Crowell et al. | June 28, 1932 |
| 2,064,468 | Foster | Dec. 15, 1936 |
| 2,164,276 | Ittner | June 27, 1939 |
| 2,329,305 | Svetlick et al. | Sept. 14, 1943 |
| 2,494,133 | Jefts | Jan. 10, 1950 |
| 2,578,326 | Toland | Dec. 11, 1951 |
| 2,646,393 | Hughes et al. | July 21, 1953 |